United States Patent Office 3,285,997
Patented Nov. 15, 1966

3,285,997
COPOLYMERS OF CHLOROSTYRENE AND
DIACRYLOPHENONES
Louis C. Rubens, Midland, Mich., assignor to The Dow
Chemical Company, Midland, Mich., a corporation of
Delaware
No Drawing. Filed July 17, 1963, Ser. No. 295,810
19 Claims. (Cl. 260—880)

This invention relates to chlorostyrene polymers. It more particularly relates to a method of preparing chlorostyrene polymers and compositions comprising chlorostyrene and biacrylophenone compounds.

In the preparation of laminates, castings, and the like wherein a polymerizable mixture is poured into a mold or cavity, or a porous material is impregnated with a polymerizable material and subsequently polymerized to form a relatively rigid product, usually it is essential for most commercial operations that the polymerization rate be relatively rapid. Thus when a laminate such as one utilizing filamentary glass is prepared, generally a glass fabric or mat is placed on or in a mold or form and the polymerizable material is added by spraying, pouring or brushing, a relatively rapid cure time is required for economic production of the final article. It is desirable that the monomeric material polymerize to a resin of sufficient strength to permit the removal of the article from the mold after a relatively short time. The resultant article should be firm and not tacky even if not completely cured or polymerized at the time of removal. Usually such laminating or casting materials must, on a practical basis, cure within a matter of minutes at temperatures between about 50 and about 100° centigrade. At lower temperatures, however, a longer cure time is usually satisfactory. A wide variety of such casting compositions are known and are typified by the epoxy and polyester resins. However, oftentimes it would be desirable to utilize chlorostyrenes for these applications because of its self-extinguishing property as well as the desirable electrical properties.

It is an object of this invention to provide a rapidly polymerizable chlorostyrene composition.

It is a further object of the invention to provide a method of rapidly polymerizing chlorostyrene.

A further object of the invention is to provide an improved chlorostyrene polymer.

These benefits and other advantages in accordance with the invention are readily achieved by admixing a major portion of a chlorostyrene with a minor portion of a diacrylophenone having the formula:

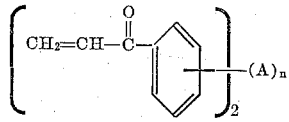

wherein $n$ is an integer from 0 to 1, A is a polyvalent member selected from the group consisting of oxygen, alkyl groups containing up to 10 carbon atoms, phenyl, phenoxy, dioxyphenyl, polyoxyphenyl, wherein said phenyl dioxyphenyl and polyoxyphenyl groups may have ring substitution including straight chain alkyl groups containing from about 1 to 4 carbon atoms, chlorine groups and nitro groups.

Such mixtures are readily copolymerized by conventional means such as the application of heat or advantageously free radical generating catalysts may be employed. The polymerized products of the invention are hard resinous materials. The physical properties may be varied by the addition of various modifying agents. Particularly beneficial among the free radical generating catalysts are the organic peroxides.

Generally the suitable organic peroxide catalysts will be selected from those having an optimum decomposition rate at the temperature of polymerization. Some of the suitable peroxides are isopropyl percarbonate, t-butyl peroxylpivalate, lauryl peroxide, benzoyl peroxide, t-butyl peroxyisobutyrate, and mono and dichloro benzoyl peroxides. Advantageously redox catalyst systems may be employed to provide free radicals such as the combination of a peroxide and a reducing agent such as n,n-dimethyltoluidine and its other well known art recognized equivalents. Azo type catalysts may also be employed such as $\alpha,\alpha'$-azobisisobutyronitrile with benefits frequently commensurate to those obtained utilizing the peroxides. Other sources of free radicals may also be utilized for the preparation of polymers in accordance with the invention including high energy ionizing radiation such as gamma radiation, X-ray, and the like. If desired, no catalyst need be employed and the material polymerized by the use of temperature alone.

The polymerization temperature utilized for a polymerizable mixture will depend upon the particular mixture, catalyst and desired cure time. Mixtures in accordance with the present invention are beneficially polymerized at temperatures from about 0° centigrade to about 200° centigrade. Radiation curing is readily accomplished at the lower portion of the range while temperatures in the range of about 150° centigrade to about 200° centigrade are suitable for non-catalyzed systems. The peroxide and azo type catalysts are generally used in the range of from about 50° centigrade to about 200° centigrade. Room temperature curing utilizing a redox system is beneficially employed in the range of from about 15° centigrade to about 75° centigrade and most beneficially in the range of from about 20° centigrade to about 40° centigrade.

The diacrylophenone components of the mixture include copolymerizable diacrylophenones which have only one point of substitution on the aromatic ring of the acrylophenone.

The diacrylophenones are readily prepared by the acylation of a suitable aromatic nucleus utilizing β-chloropropionyl chloride. For example, 4,4'-biacrylophenone (Table I, Formula III) is prepared by treating one mole of biphenyl dissolved in methylene chloride with 2.4 moles of aluminum chloride and 2.1 moles of β-chloropropionyl chloride. This mixture is refluxed under atmospheric pressure for about one hour to form the 4,4'-dichloroethylketobiphenyl which is recovered by chilling to about 0° centigrade with ice, and the solid product filtered from the water-methylene chloride mixture. This product is then recrystallized from a 1:1 mixture of methyl chloride and methanol. The resultant 4,4'-bischloroethylketobiphenyl is dehydrohalogenated by dissolving in tetrahydrofuran in the presence of 3 moles of triethylamine per mole of the chloroethylketo compound. This is readily accomplished by agitating the mixture for about one hour at a temperature of about 30° centigrade. The 4,4'-biacrylophenone is recovered by admixing the reaction mixture with methanol to precipitate the product.

Other diacrylophenone compounds are readily prepared in a similar manner wherein proportional molar quantities are utilized. For example, 4,4'-oxydiacrylophenone (Table I, Formula I) is prepared when diphenyloxide is substituted for diphenyl. 4,4'-ethylenediacrylophenone (Table I, Formula II) is prepared when biphenylethylene is utilized instead of biphenyl. 4,4'-hexamethylenediacrylophenone (Table I, Formula IV) is prepared when 1,6-diphenylhexane is employed instead of biphenyl. 4,4'-(p-phenylene)diacrylophenone (Table I, Formula V) is prepared when phenylbenzene is employed instead of biphenyl. 4,4'-oxybis(p-phenyleneoxy) diacrylophenone (Table I, Formula VI) is prepared when 4,4'-bisphenoxydiphenyloxide is employed instead of biphenyl. 4,4'-(2-nitro-p-phenylenedioxy)diacrylophenone (Table I, Formula VII) is prepared when 2,5-diphenoxynitrobenzene is utilized in place of biphenyl. 4,4'-(2,3-dichloro - p - phenylenedioxy)diacrylophenone (Table I, Formula VIII) is prepared when 1,2-dichloro-3,6-diphenoxybenzene is utilized instead of diphenyl. 4,4'-(2-ethyl-5 - methyl-p-phenylenedioxy)diacrylophenone (Table I, Formula IX) is prepared when 1,5-diphenoxy-4-ethyltoluene is utilized in place of biphenyl. 4,4'-sec-butylidenediacrylophenone (Table I, Formula X) is prepared when 2,2-diphenylbutane is utilized in place of diphenyl. In a similar manner other diacrylophenones are readily prepared.

TABLE I

Formula No. I

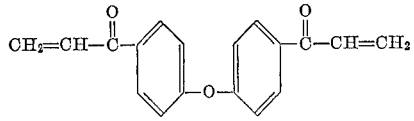

Formula No. II

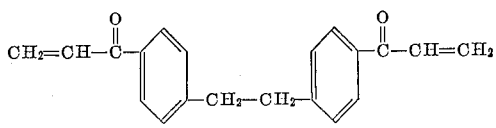

Formula No. III

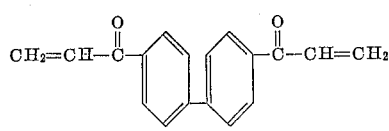

Formula No. IV

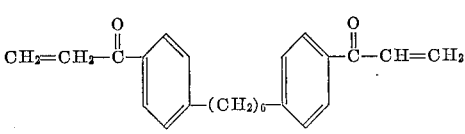

Formula No. V

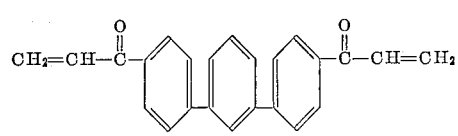

Formula No. VI

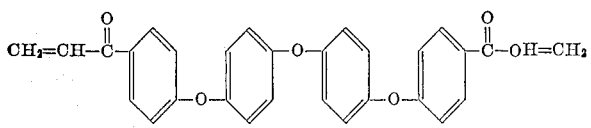

Formula No. VII

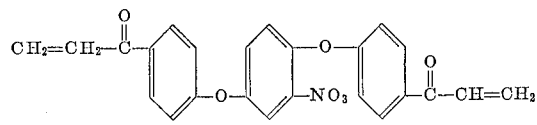

Formula No. VIII

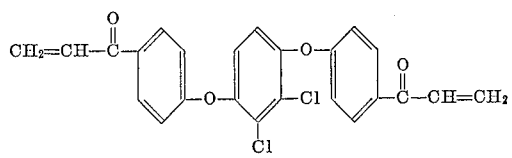

Formula No. IX

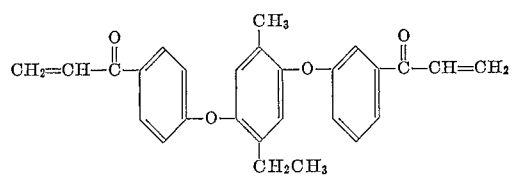

Formula No. X

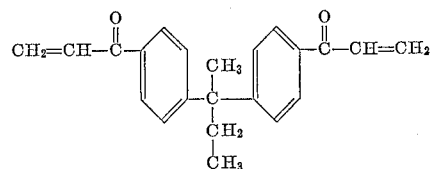

Generally in order to achieve desired rates of polymerization, it is advantageous to have at least a 1 percent by weight of the diacrylophenone compound present in the mixture. Quantities of the diacrylophenone in excess of about 50 percent are operative but generally are undesirable as the properties of the chlorostyrenes are suppressed. Usually it is beneficial to employ from about 1 to about 20 percent of the diacrylophenone in the mixture based upon the combined weight of the polyacrylophenone and the chlorostyrene. Advantageously for most economic and desired performance one utilizes from about 0.001 to about 0.1 mole percent of the diacrylophenone in admixture with the chlorostyrene. Any of the chlorostyrene isomers are readily utilized in the practice of the invention and all dichlorostyrenes with the exception of the 2,6-dichlorostyrene may be utilized. The operable dichlorostyrene monomers are 2,3-dichlorostyrene, 2,4-dichlorostyrene, 2,5-dichlorostyrene, 3,4-dichlorostyrene and 3,5-dichlorostyrene.

Beneficially, if desired, the organic peroxide may be added at a sufficient level to provide the desired reaction rate. This is usually from about 0.001 percent by weight to about 2 percent by weight based on the combined weight of the diacrylophenone and the chlorostyrene.

Advantageously various additives may be employed such as the conventional stabilizers, dyes, pigments, fillers, and the like, dependent upon the particular characteristics desired in the mixture.

In order to obtain a monomeric mixture of suitable viscosity soluble resinous materials may be added to the monomers such as polychlorostyrene, polystyrene, poly-α-methylstyrene, poly-o-vinylstyrene and other such copolymers are eminently satisfactory. These resins are added at any convenient stage. For example, they may be readily dissolved in the chlorostyrene monomer or dissolved in a mixture of the chlorostyrene monomer and the diacrylophenone compound, either with or without catalysts and fillers being present. Generally it is most advantageous to initially dissolve the thickening or viscosity increasing resin in the chlorostyrene monomer. Oftentimes it is beneficial to form a chlorostyrene monomer mixture of relatively high viscosity by partially polymerizing the chlorostyrene component to a conversion of from about 5 to about 30 percent by thermal means in order to obtain a material of suitable viscosity. Usually it is desirable for many applications to utilize a mixture having a viscosity of about 2000 centipoises at 25° centigrade.

A particularly advantageous and beneficial embodiment of the invention is the incorporation of amounts of an elastomer into the polymerizable mixture of the chlorostyrene and diacrylophenone compound. Such elastomers include the nitrile rubbers, butadiene rubbers, styrene-butadiene, unsaturated polyester rubbers and the like. The addition of such rubbers to the monomeric mixtures generally increase the elongation, improve the impact strength, and in general provide a significantly and substantially tougher product than is obtainable with the use of the chlorostyrene diacrylophenone polymer alone. The elastomer modified compositions are particularly useful as adhesives, components of caulking compounds and the like. If relatively large proportions of the rubber modifier are employed a relatively soft flexible product is obtained, while if lesser quantities are utilized, the materials become more rigid following about the same pattern of changes in physical properties as are usually encountered with the modification of rigid thermoplastic materials utilizing elastomers. Such elastomers are readily incorporated in the polymerizable mixture by dispersing in the chlorostyrene or chlorostyrene mixture prior to polymerization. Beneficially these rubbers may be soluble or dispersable within the mixture. However, to be effective as reinforcing agents in general, they should have a swelling coefficient in the particular chlorostyrene utilized of at least about two. By the swelling coefficient is meant the minimum volume to which the rubber will expand when immersed in the particular chlorostyrene system without mechanical agitation at equilibrium at a temperature of about 60° centigrade. The particular rubber to be utilized will be chosen for the properties desired in the finished product. Such products are tough, readily curable materials and are advantageously employed as adhesives for wood, metals, plastics and various laminates such as plywood and the like.

The invention is further illustrated, but not limited, by the following examples:

Example I

A solution of 20 percent by weight of polyorthochlorostyrene in orthochlorostyrene monomer was prepared. This mixture had a viscosity of about 2000 centipoises at a temperature of about 20° centigrade. To 96 parts of this solution was added 4 parts of 4,4'-oxydiacrylophenone and ½ part of benzoyl peroxide. This mixture was agitated for about 20 minutes until the diacrylophenone and peroxide were dissolved. Fifty parts of this mixture were poured onto 30 parts by weight of a fibrous glass mat and the impregnated mat was compressed and cured at a temperature of 95° for 10 minutes under a pressure of 10 pounds per square inch. The resultant panel was about 1/10 of an inch in thickness and contained 20 percent glass by volume embedded in the cured rigid resin matrix. The physical properties of the resultant panel were:

Flexural strength (p.s.i.) 29,000
Flexural modulus (p.s.i.$\times 10^6$) 1.5
Tensile strength (p.s.i.) 18,000
Panel density (gms./cc.) 1.54
Appearance: Translucent
Rockwell hardness: (M scale) 110.

The panel was self-extinguishing.

Example II

A plurality of samples were prepared by admixing orthochlorostyrene and 4,4'-oxydiacrylophenone and 1 percent benzoylperoxide and polymerizing at a temperature of 80° centigrade. Sample A comprised 98.3 weight percent orthochlorostyrene and 1.7 percent 4,4'-oxydiacrylophenone. Sample B was 95.36 weight percent orthochlorostyrene and 4.64 percent oxydiacrylophenone. Sample C was 92.44 weight percent orthochlorostyrene and 7.56 weight percent oxydiacrylophenone. A blank was run wherein 100 percent orthochlorostyrene is employed. Sample A polymerized to 90 percent conversion in 23½ minutes, sample B to 90 percent conversion in 13 minutes, while sample C reached 90 percent conversion in 8 minutes. The blank required 59 minutes to reach 90 percent conversion. 100 percent conversion for samples A, B, C and the blank was reached in periods of about 13, 23, 36 and about 75 minutes respectively.

Example III

The procedure of Example II was repeated with the exception that the monomer mixture comprised 98.4 percent by weight of orthochlorostyrene and 1.6 percent by weight of biacrylophenone. A second sample contained 95.6 percent by weight of orthochlorostyrene and 4.37 percent by weight of biacrylophenone. The first sample reached 90 percent conversion in 24 minutes whereas a second sample required 11½ minutes to reach 90 percent conversion. A blank without biacrylophenone (100 percent on the chlorostyrene) required 59½ minutes to reach 90 percent conversion.

Example IV

The procedure of Example II was repeated wherein a sample was utilized comprising 92.14 percent by weight of orthochlorostyrene and 7.86 percent by weight of 4,4'-ethylenediacrylophenone and that ½ of 1 percent of benzoylperoxide was employed. 90 percent conversion was obtained after 17½ minutes whereas in the blank only 62 percent conversion was obtained after 70 minutes. 100 percent conversion was obtained at about 28 minutes.

Example V

In a manner similar to Example II a plurality of samples were prepared using a mixture of 96 percent by weight of orthochlorostyrene and 4 percent by weight of 4,4'-oxydiacrylophenone employing 0.05, 0.1, 0.5, 1 percent by weight, and a sample with no benzoylperoxide. These samples were polymerized at 80° centigrade. 90 percent conversion was obtained for the uncatalyzed sample after about 228 minutes, at 104 minutes with the sample containing 0.05 percent benzoylperoxide, 56 minutes for the sample containing 1/10 of 1 percent benzoylperoxide, 23 minutes for the sample containing ½ percent benzoylperoxide, and about 17 minutes for the sample containing 1 percent benzoylperoxide.

Example VI

A plurality of samples were prepared utilizing orthochlorostyrene and 4,4'-oxybisacrylophenone in a ratio of 98:2 parts. One-half of one percent benzoylperoxide based on the weight of the monomers was employed and a quantity of a rubber was added by dissolving in the orthochlorostyrene and the resultant mixture polymerized at 95° centigrade for 20 minutes in a mold which was 0.125 inch in thickness having a plurality of openings therein one-half inch wide and 6 inches long. The resultant polymerized portions were then evaluated for their physical properties. The results are set forth in the following table:

TABLE II

*Copolymers of OCS and BUKBPO by inclusion of various polyolefin rubbers*

| No. | Monomer (percent) | Rubber Type (percent) | Properties of Cast Resins | | | | |
|---|---|---|---|---|---|---|---|
| | | | Flex Strength (p.s.i.) | Flex Modulus (p.s.i.×10⁵) | Flat Impact (Izod) | Heat Dist (° C.) | Appearance |
| 4-2 | 94.5 | ¹ 5 | 6,900 | 2.68 | 1.4 | 90 | Translucent. |
| 4-3 | 89.5 | ¹ 10 | 7,350 | 2.60 | 4.9 | 91 | Do. |
| 4-5 | 89.5 | ² 10 | 7,330 | 2.91 | 2.3 | 86 | Do. |
| 4-7 | 89.5 | ³ 10 | 4,550 | 2.06 | 10 | 75 | Tan, opaque. |
| 4-14 | 84.5 | ⁴ 15 | 4,830 | 2.00 | 8.4 | 74 | Translucent. |
| 5-5 | 94.5 | ⁵ 5 | 10,100 | 3.72 | 1.3 | 82 | Do. |
| 5-14 | 89.5 | ⁶ 10 | 6,400 | 2.83 | 1.8 | 89 | Do. |
| 5-18 | 89.5 | ⁷ 10 | 6,100 | 2.4 | 2.7 | 76 | Do. |

¹ Stereospecific polybutadiene rubber consisting of greater than 90 percent butadiene polymerized by 1,4-addition of about 35 percent cis-1,4- addition and a Mooney viscosity of about 55.
² Stereospecific polybutadiene rubber consisting of greater than 90 percent butadiene polymerized by 1,4-addition of about 35 percent cis-1,4- addition and a Mooney viscosity of about 35.
³ An acrylonitrile butadiene rubber containing copolymerized therein 32 parts of acrylonitrile and 68 parts of butadiene and having a Mooney viscosity of about 55.
⁴ A styrene butadiene rubber composed of 25 parts of styrene, 75 parts of butadiene, and having a Mooney viscosity of about 50.
⁵ A styrene butadiene rubber composed of 25 parts of styrene, 75 parts of butadiene, and having a Mooney viscosity of about 55.
⁶ Stereospecific styrene butadiene rubber containing 75 parts of butadiene and 25 parts of styrene having a Mooney viscosity of about 48 and showing about 95 percent cis-1,4- addition.
⁷ Styrene butadiene copolymer rubber containing 23 parts by weight polymerized styrene and 77 parts by weight of butadiene having a Mooney viscosity of about 52.

Example VII

A series of samples were prepared utilizing solutions of polystyrene in orthochlorostyrene. Varying quantities of 4,4'-oxydiacrylophenone together with one-half part by weight of benzoyl peroxide and 0.05 part by weight of n,n-dimethyl toluidine were admixed and permitted to cure at about 30° centigrade. The results are set forth in Table III.

TABLE III

| Sample No. | Percent O-Chloro Styrene | Percent Poly-Styrene | 4,4'-oxydi-acrylo-phenone | Initial Condition | Condition After 1 hr. at 30° C. | Condition After 16 hrs. at 30° C. |
|---|---|---|---|---|---|---|
| 1 | 64.45 | 35.0 | 0 | Viscous fluid | Unchanged | Hazy very viscous fluid. |
| 2 | 62.45 | 35.0 | 2 | do | do | Firm gel. |
| 3 | 60.45 | 35.0 | 4 | do | Soft gel | Hard resin. |
| 4 | 58.45 | 35.0 | 6 | do | do | Do. |
| 5 | 54.45 | 35.0 | 10 | do | do | Do. |

The resultant hard resinous products were found to be satisfactory for use as machinable castings and also could be cast to a desired shape without the appearance of undesirable bubbles or similar defects.

In a manner similar to the foregoing examples commensurate, beneficial and advantageous results are obtained when the diacrylophenone is replaced whether wholly or in part with 4,4'-hexamethylenediacrylophenone,
4,4'-(p-phenylene)diacrylophenone,
4,4'-oxybis(p-phenyleneoxy)-diacrylophenone,
4,4'-2-(nitro-p-phenylenedioxy)diacrylophenone,
4,4'-(2,3-dichloro-p-phenylenedioxy)diacrylophenone,
4,4'-(2-ethyl-5-methyl-p-phenylenedioxy)diacrylophenone, or
4,4'-sec-butylidenediacrylophenone.

Similar advantageous and beneficial results are achieved when the procedure of the foregoing examples is repeated utilizing as the chlorostyrene, metachlorostyrene, parachlorostyrene, 2,3-dichlorostyrene, 2,4-dichlorostyrene, 2,5-dichlorostyrene, 3,4-dichlorostyrene, 3,5-dichlorostyrene, and mixtures thereof.

As is apparent from the foregoing specification, the method and composition of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a rigid polymer of a chlorostyrene comprising admixing a major portion of a chlorostyrene selected from the group consisting of orthochlorostyrene, metachlorostyrene, parachlorostyrene, 2,3-dichlorostyrene, 2,4-dichlorostyrene, 2,5-dichlorostyrene, 3,4-dichlorostyrene, 3,5-dichlorostyrene, and mixtures thereof with a minor portion of a diacrylophenone having the formula:

$$\left[ CH_2=CH-\overset{O}{\underset{\|}{C}}-\underset{2}{\bigcirc}\right]-(A)_n$$

wherein $n$ is 0 or 1 and A is a polyvalent member selected from the group consisting of oxygen, alkyl groups containing up to 10 carbon atoms, phenyl, phenoxy, dioxyphenyl, polyoxyphenyl, wherein said phenyl, dioxyphenyl, and polyoxyphenyl groups may have ring substitution including straight chain alkyl groups containing from about 1–4 carbon atoms, chlorine groups and nitro groups, and polymerizing said mixture to a rigid polymer.

2. The method of claim 1 including the step of providing a free radical generating catalyst in the nominal mixture.

3. The method of claim 2 wherein the free radical generating catalyst is an organic peroxide.

4. The method of claim 3 wherein the organic peroxide present in an amount of from about 0.1 to about 3 percent by weight is based on the total weight of the chlorostyrene and the diacrylophenone compound.

5. The method of claim 1 wherein the diacrylophenone is 4,4'-oxydiacrylophenone.

6. The method of claim 1 wherein the diacrylophenone is 4,4'-ethylenediacrylophenone.

7. The method of claim 1 wherein the diacrylophenone is 4,4'-biacrylophenone.

8. The method of claim 1 wherein the diacrylophenone comprises from about 1 to about 20 percent by weight of the combined weights of the chlorostyrene and the diacrylophenone.

9. The method of claim 1 wherein the chlorostyrene is monochlorostyrene.

10. The method of claim 9 wherein the chlorostyrene is orthochlorostyrene.

11. The method of claim 1, wherein a compatible polymeric material is dispersed within the monomer mixture.

12. The method of claim 11, wherein the polymeric material is a polychlorostyrene.

13. A polymerizable monomeric mixture comprising a major portion of a chlorostyrene selected from the group consisting of orthochlorostyrene, metachlorostyrene, parachlorostyrene, 2,3-dichlorostyrene, 2,4-dichlorostyrene, 2,5 - dichlorostyrene, 3,4 - dichlorostyrene, 3,5 - dichlorostyrene, and mixtures thereof with a minor portion of a diacrylophenone having the formula:

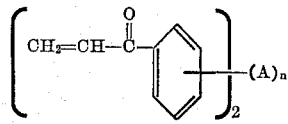

wherein $n$ is 0 or 1 and A is a polyvalent member selected from the group consisting of oxygen, alkyl groups containing up to 10 carbon atoms, phenyl, phenoxy, dioxyphenyl, polyoxyphenyl, wherein said phenyl, dioxyphenyl and polyoxyphenyl groups may have ring substitution including straight chain alkyl groups containing from about 1–4 carbon atoms, chlorine groups and nitro groups.

14. The mixture of claim 13 including a free radical generating catalyst.

15. The mixture of claim 13 wherein the polyacrylophenone is a biacrylophenone.

16. The mixture of claim 13 wherein the polyacrylophenone is present in a proportion of from about 1 to about 20 percent by weight of the combined weight of the polyacrylophenone and the chlorostyrene.

17. The mixture of claim 13 including a quantity of a chlorostyrene soluble polymer sufficient to significantly increase the viscosity of the composition.

18. The mixture of claim 14 wherein the soluble polymer is a rubber.

19. A copolymer comprising a major portion of a chlorostyrene and a minor portion of a biacrylophenone.

No references cited.

MURRAY TILLMAN, *Primary Examiner.*

J. T. GOOLKASIAN, *Assistant Examiner.*